United States Patent
Sugata et al.

(10) Patent No.: US 6,938,633 B2
(45) Date of Patent: Sep. 6, 2005

(54) METHOD AND APPARATUS FOR SUPPLYING PROCESS LIQUID FOR MACHINE TOOL

(75) Inventors: Shinsuke Sugata, Fukuyama (JP); Tadashi Makiyama, Onomichi (JP); Takanori Miyata, Fukuyama (JP)

(73) Assignee: Horkos Corp., Fukuyama (JP)

( * ) Notice: Subject to any disclaimer, the term of this patent is extended or adjusted under 35 U.S.C. 154(b) by 270 days.

(21) Appl. No.: 10/326,607

(22) Filed: Dec. 23, 2002

(65) Prior Publication Data

US 2004/0118457 A1 Jun. 24, 2004

(51) Int. Cl.⁷ .............................. F16K 31/18; F17D 1/00
(52) U.S. Cl. ........................ 137/1; 137/238; 137/386; 137/434; 137/565.01; 137/571; 141/198; 184/6.14; 184/7.4; 29/DIG. 94; 409/136; 222/67; 210/123; 210/168; 210/418
(58) Field of Search ................................ 137/238, 386, 137/409, 428, 434, 565.01, 571, 1; 29/DIG. 50, DIG. 90, DIG. 94, DIG. 77; 141/85, 86, 115, 120, 198; 184/6.14, 6.21, 6.24, 7.4; 210/121, 123, 134, 168, 171, 409, 416.5, 418, 744; 222/67, 109; 408/1 R, 56, 61; 409/135, 136, 137

(56) References Cited

U.S. PATENT DOCUMENTS

| | | | | |
|---|---|---|---|---|
| 1,518,154 A | * | 12/1924 | La Ducer | 409/136 |
| 2,434,679 A | * | 1/1948 | Wagner et al. | 210/167 |
| 3,518,917 A | * | 7/1970 | Sluhan | 408/56 |
| 4,151,854 A | * | 5/1979 | Patsko | 137/3 |
| 4,530,626 A | * | 7/1985 | Sabbioni | 409/135 |
| 4,657,068 A | * | 4/1987 | Peltz | 408/61 |
| 4,708,539 A | * | 11/1987 | Threadgill | 408/61 |
| 4,982,755 A | * | 1/1991 | Roberts et al. | 137/3 |
| 5,205,686 A | * | 4/1993 | de Caussin | 409/131 |
| 5,230,793 A | * | 7/1993 | Lenhart et al. | 210/168 |
| 5,421,683 A | * | 6/1995 | Keehn | 409/136 |
| 5,466,380 A | * | 11/1995 | Bratten | 184/6.14 |
| 5,535,496 A | * | 7/1996 | Sugino et al. | 409/136 |
| 5,586,848 A | * | 12/1996 | Suwijn | 409/137 |
| 5,800,104 A | * | 9/1998 | Miyano | 409/137 |
| 5,944,263 A | * | 8/1999 | Lucco et al. | 408/61 |
| 6,036,413 A | * | 3/2000 | Chandrasekar | 409/135 |
| 6,655,245 B2 | * | 12/2003 | Schuettel | 409/135 |
| 2004/0047700 A1 | * | 3/2004 | Maeda | 409/137 |

* cited by examiner

*Primary Examiner*—Kevin Lee
(74) *Attorney, Agent, or Firm*—Merek, Blackmon & Voorhees, LLC

(57) ABSTRACT

The present invention provides a method and apparatus for supplying process liquid s for a machine tool, which are able to reduce the consumption power and power factor of the pump 21 to a large extent in comparison with prior arts while maintaining the effects of process liquid s according to prior arts. The invention is embodied so that process liquid s such as coolant or cleaning fluid is supplied to necessary points by causing the process liquid s to flow down, which is stored in a sub tank 20 installed at a suitable height in a machine tool, by a gravity action when intermittently supplying the process liquid s such as coolant or cleaning fluid to the necessary points such as a workrest 2 and a workpiece w fixed thereon; the supplied process liquid s is collected into a main tank 19 on the other hand; and the process liquid s stored in the main tank 19 is transferred into the sub tank 20 by the pump 21.

11 Claims, 4 Drawing Sheets

METHOD AND APPARATUS FOR SUPPLYING PROCESS LIQUID FOR MACHINE TOOL

TECHNICAL FIELD

The present invention relates to a method and apparatus for supplying process liquid for a machine tool. Herein, the process liquid includes coolant and cleaning fluid.

BACKGROUND ART

FIG. 4 shows an example of a prior art process liquid supplying apparatus for a machine tool. The prior art process liquid supplying apparatus is provided with a tank 19 for collecting a process liquid s, which is supplied to points, for which it is necessary to supply a process liquid, such as a workrest and a workpiece w fixed thereon, a pump 21 for transferring the process liquid s in the tank 19, and process liquid passage means 22a for supplying the process liquid s transferred from the pump 21 to points, for which it is necessary to supply the process liquid, at an optional time.

Cutting chips produced through machining by a machine tool are adhered to or accumulated on a workpiece w and workrest. In order to accurately fix a next workpiece w on the workrest, it is necessary to remove such cutting chips remaining on the workrest when machining of the workpiece w is completed. To solve the above, a process liquid s is consecutively supplied through the process liquid passage means 22a by the pump 21 under adequate pressure at a flow rate over the maximum instantaneous flow rate required, so that cutting chips produced by machining are washed away into the inflow portion of the tank 19. The process liquid s thus supplied may be supplied at frictional points between a workpiece w and a tool as necessary.

In the supply of process liquid s through the process liquid passage means 22a by the above-described prior art pump 21, the discharge capacity of the pump 21 is required to have such a size as can consecutively supply the process liquid at a flow rate over the maximum instantaneous flow rate required to wash away at least cutting chips.

Herein, where it is assumed that the required maximum instantaneous flow rate is Q1, the pressure of process liquid is P0 when it is flown from the terminal of the process liquid passage means 22a, and the pressure loss of process liquid from the outlet of the pump 21 to the terminal of the process liquid passage means 22a is P1, consumption power W1 of the pump 21 is expressed by the following expression: That is, $$W1 = k \square Q \square (P0 + P1)$$

Where k is a constant, and (P0+P1) is discharge pressure of the pump 21.

In an actual example of a machine tool, the above-described Q1 is approximately 200 liters per minute, and the above-described (P0+P1) is approximately 0.3 Mpa. Therefore, the consumption power of the pump becomes comparatively large. There may be cases where the consumption power thereof exceeds approximately 25% of the entire consumption power of a machine tool.

The present invention is considered in view of the above-described situations. It is therefore an object of the invention to provide a method and apparatus for supplying process liquid for a machine tool, by which power required to supply process liquid (coolant and cleaning fluid) can be decreased while maintaining a washing-away capacity of cutting chips produced through machining and a lubrication capacity for points to be lubricated in machining.

DISCLOSURE OF THE INVENTION

In order to solve the above-described object, a method for supplying process liquid for a machine tool according to the invention, which is embodied by the steps of supplying process liquid such as coolant or cleaning fluid to necessary points by causing the process liquid to flow down, which is stored in a sub tank installed at a suitable height, by a gravity action when intermittently supplying the process liquid to the necessary points such as a workrest and a workpiece fixed thereon in the machine tool, collecting the thus-supplied process liquid into the main tank on the other hand, and transferring the process liquid in the main tank into the sub tank by the pump is carried out.

In the invention, process liquid of a volume roughly coincident with the one-time supply volume is stored in the sub tank when the supplying of the process liquid is commenced. And, the stored process liquid is supplied by a gravity action to the workrest and a workpiece fixed thereon while holding the entire head (for example, 0.5 through 10 meters) equivalent to necessary discharge pressure and maintaining a state where the process liquid flows or drops at more than the maximum necessary instantaneous flow rate. Such a supply of process liquid, in particular, effectively acts to wash off the workrest and cutting chips adhered to a workpiece.

Further, in a state where supply of process liquid from the sub tank to the workrest and a workpiece is stopped, transfer of the process liquid into the sub tank is enabled by a pump, wherein, even in a case where the pump has a comparatively small discharge capacity, process liquid of a necessary volume can be transferred into the sub tank before the necessary time comes.

Therefore, in the invention, even if the pump has a comparatively small discharge capacity and the entire head of process liquid at an optional point in the sub tank is comparatively low, wash-away of cutting chips can be adequately carried out as in the prior art, and lubrication of necessary points to be lubricated can be accurately carried out by process liquid as in the prior art. Therefore, it is possible to reduce the consumption power of the pump to a large extent in comparison with the prior arts in a state where the conventional effects of process liquid is maintained.

At this time, in the invention, when process liquid of a necessary volume is stored in the sub tank, it is better that a transfer of the process liquid by the pump is caused to stop. If so, any surplus process liquid is not transferred into the sub tank, wherein the consumption power of the pump can be further reduced.

An apparatus according to the invention is constructed so as to comprise a main tank into which process liquid such as coolant and cleaning fluid supplied to necessary points of the workrest and a workpiece fixed thereon is caused to flow; a sub tank which is installed at a higher position by a specified distance than the above-described workrest and which stores process liquid of a volume roughly equivalent to the one-time supply volume to the above-described necessary points for the process liquid to be supplied; a pump for transferring the process liquid in the above-described main tank into the above-described sub tank; and process liquid passage means for causing process liquid in the sub tank to flow out by a gravity action toward the above-described necessary points, to which process liquid is supplied, at any optional time.

In the invention, since process liquid of a volume roughly equivalent to the one-time supply volume, which is stored in the sub tank, is caused to pass through process liquid passage means, the process liquid is supplied to necessary points in states where the entire head is comparatively low and the process liquid is caused to flow out at a flow rate over the maximum necessary instantaneous flow rate. As described above, such supply of the process liquid, in particular, effectively acts in washing-away of cutting chips adhered to the workrest and a workpiece.

Although the supply of process liquid from the sub tank is temporarily stopped after the process liquid of the one-time supply volume flows out from the sub tank, the pump is consecutively or non-consecutively transferred into the sub tank while the process liquid is intermittently supplied as described above. At this time, since the transfer of process liquid by the pump can be carried out while the supply of process liquid from the sub tank is stopped, even if the pump has a comparatively small discharge capacity, the sub tank is able to transfer process liquid of more than the one-time supply volume by the pump before subsequent supply thereof is commenced.

Therefore, even if the pump has only a comparatively small discharge capacity and the entire head of the process liquid is comparatively low in the sub tank, washing-away of cutting chips and lubrication to necessary points can be appropriately carried out as in the prior arts. As a result, the consumption power of the pump can be greatly reduced in comparison with the prior arts with the effects of process liquid maintained.

The above-described invention can be embodied as follows:

That is, the apparatus is constructed so that, where it is assumed that the one-time supply volume of process liquid is Q1 when intermittently supplying process liquid to necessary points, discharge time during which process liquid of one-time supply volume is caused to flow out from the sub tank to a workpiece is T1, and the time from discharge of process liquid of the above-described one-time supply volume to discharge of the process liquid of the next one-time supply volume is T2, the discharge rate Q of a pump is a value or more, which is calculated by Expression Qmin= Q1×T1/T2, and is made smaller than the maximum flow rate of process liquid of the above-described one-time supply volume.

According to the above-described apparatus, after the pump discharges process liquid of one-time supply volume flows out, the process liquid in the main tank is transferred into the sub tank until commencement of the next supply. At this time, a contribution is made to the lowering in waste power consumption of the pump wherein the discharge rate Q of the pump is smaller than the maximum flow rate of the process liquid of one-time supply volume.

In addition, the sub tank is installed so that its bottom is higher by approximately 0.5 through 10 meters than the upper surface of the workrest, wherein when the pump transfers process liquid from the main tank to the sub tank, the discharge pressure may be reduced to, for example, approximately one-tenth of that of the prior arts. In this case, the process liquid can be smoothly supplied to necessary points for which the process liquid must be supplied. And, at this time, a lowering in the discharge pressure of the pump can greatly contribute to a lowering in the consumption power of the pump.

BEST MODE FOR CARRYING OUT THE INVENTION

A detailed description is given of the present invention with reference to the accompanying drawings.

Figure 1:
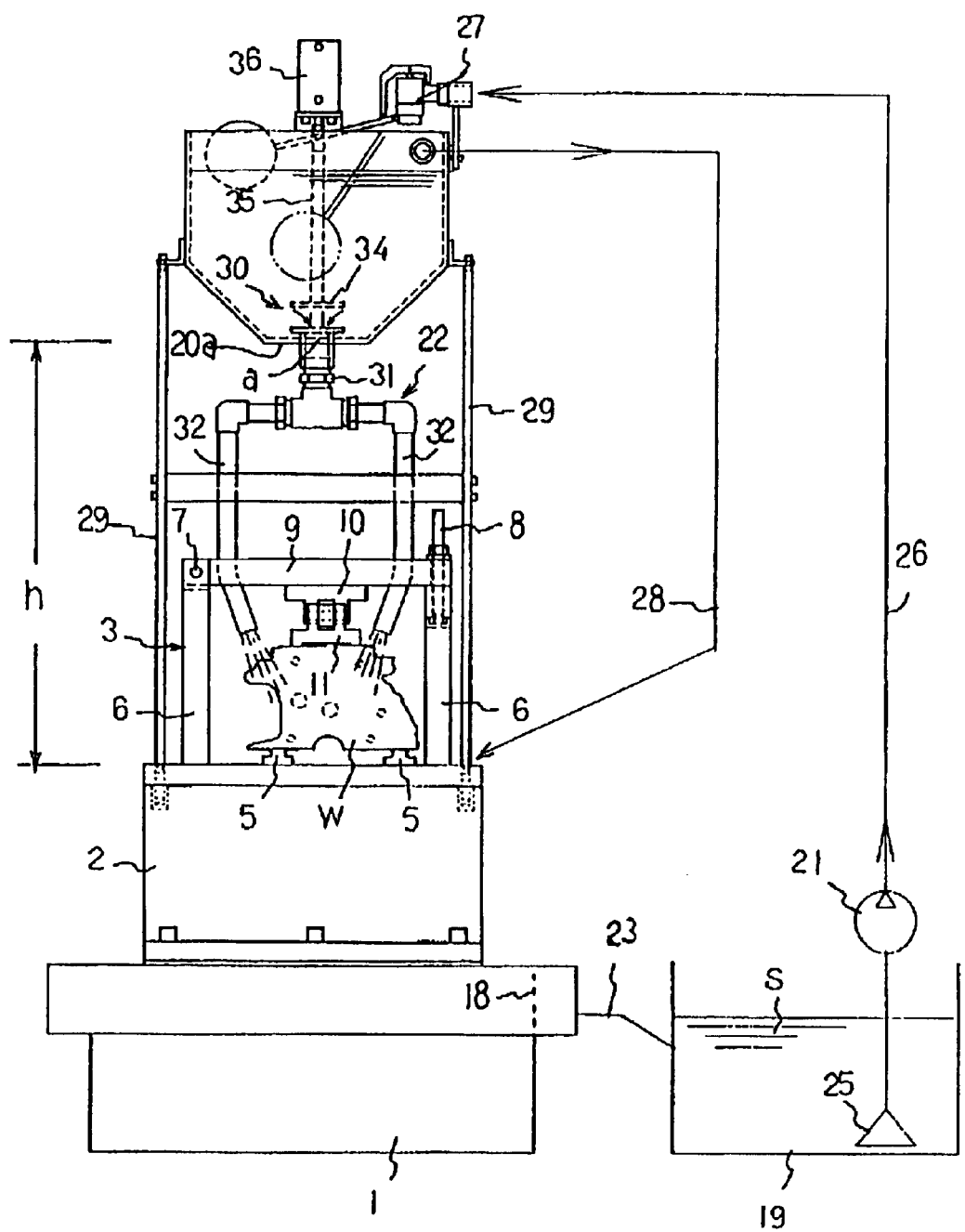
FIG. 1 is a front elevation view of an apparatus for supplying process liquid for a machine tool according to the invention with a part thereof omitted.
Figure 2:
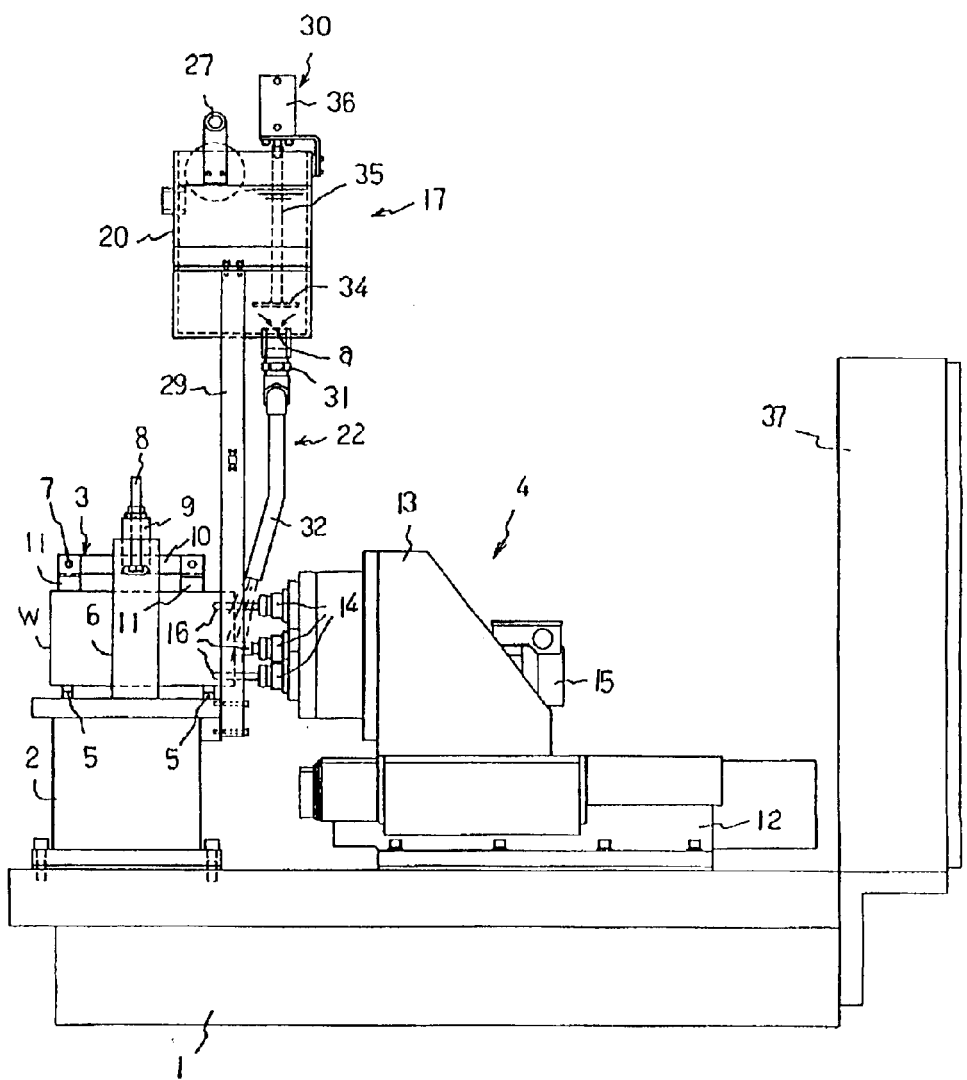
FIG. 2 is a side elevation view of the apparatus for supplying process liquid for a machine tool.
Figure 3:
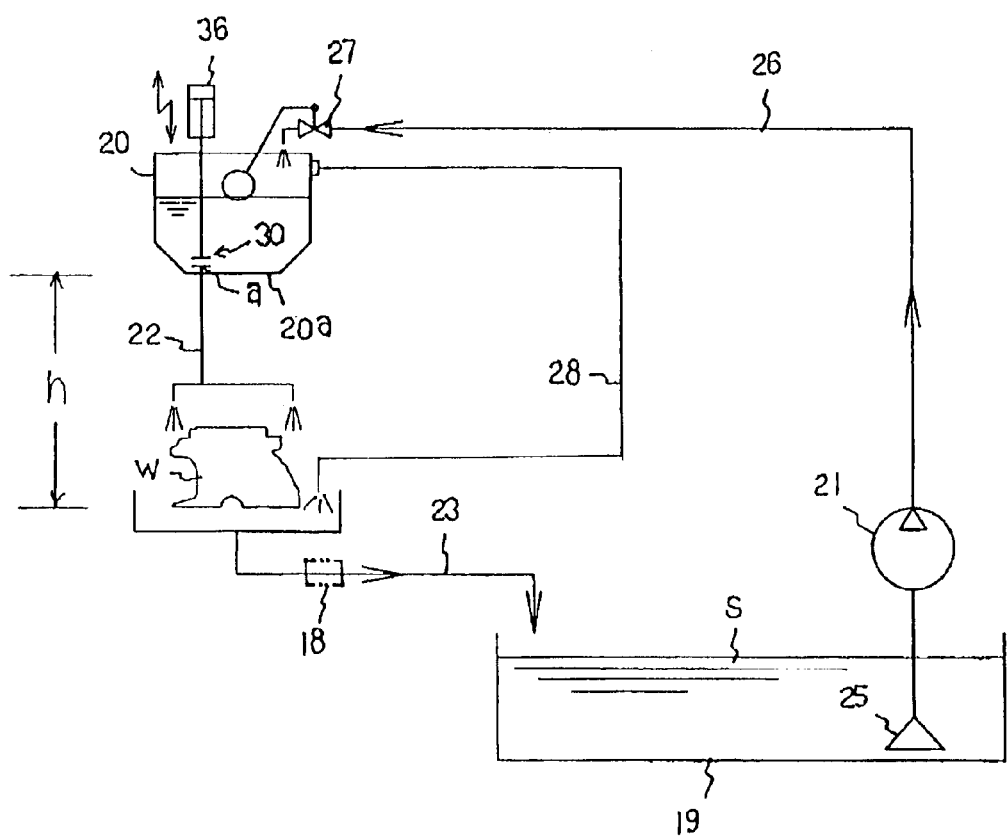
FIG. 3 is a view showing a system for supplying process liquid in the above-described machine tool.

FIG. 1 through FIG. 3 show an apparatus for supplying process liquid for a machine tool according to the invention, wherein FIG. 1 is a front elevation view thereof with a part omitted, FIG. 2 is a side elevation view thereof, and FIG. 3 is a view showing the process liquid supplying system thereof.

In these drawings, reference number 1 denotes a foundation base. A workrest 2 is fixed on the foundation base 1. A fixture (jig) 3 is provided to fix a workpiece w on the workrest 2. Workpiece machining means 4 is formed on the foundation base 1.

The above-described workrest 2 is structured so that it fixes receiver members 5 and 5 which support the workpiece w on the upper surface of the workrest 2, collects process liquid s flown on the workpiece w and the upper surface of the workrest 2 by a gravity action, and causes the process liquid to flow into another place.

A fixture 3 has a gate-like holding structure, using left and right erecting members 6 and 6, and a horizontal member 9 suspended between the upper ends of the erecting members 6 and 6 via an axis 7 and tightening means 8, and at the same time, is further structured so that a forward and backward clamping member 10 is engaged on the underside at the middle of the length of the horizontal member 9, workpiece fitting members 11 and 11 are seated in the forward and backward ends of the clamping member 10, the workpiece fitting members 11 and 11 are fitted to the upper surface of a workpiece w under pressure by operating and tightening the above-described tightening means 8 when fixing the workpiece w on the workrest 2 while, when setting the workpiece w on the workrest 2 and removing the same therefrom, the horizontal member 9 is caused to rock around the axis 7 and the workpiece w is lifted and is made movable.

And, the above-described workpiece machining means 4 is provided with a forward and backward guide track 12, which is fixed on the foundation base 1, and a gang head 13 that is guided by the guide track 12 and is caused to move forward and backward. The gang head 13 has a number of forward and backward spindles 14 mounted rotatably thereon. Further, the gang head 13 is provided with a motor 15 that rotates and drives the spindles 14, and a cutter 16 is set in the respective spindles 14.

A process liquid supplying apparatus 17 supplies process liquid to the upper surface of the above-described workrest 2 and necessary points of a workpiece w fixed on the above-described workrest 2, and washes away cutting chips produced by machining the workpiece while lubricating frictional points between the workpiece w and the cutters 16.

The process liquid supplying apparatus 17 includes a filter box 18 into which process liquid supplied to the workpiece w fixed on the workrest 2 and cutting chips are caused to flow, a main tank 19 into which the process liquid s from which cutting chips are removed by the filter box 18 is caused to flow, a sub tank 20 that is installed at a higher position by a specified distance than the workrest 2 and stores process liquid s of a volume approximately equivalent to one-time supply volume of the process liquid s to the workpiece w, a pump 21 for sending process liquid s in the main tank 19 into the sub tank 20, and process liquid passage means 22 that is structured so as to feed the process liquid s in the sub tank 20 by a gravity action to necessary points, to which the process liquid s is supplied, at any optional time.

And, a tubing channel 23 causes the filter box 18 to communicate with the main tank 19, and causes the process liquid s in the filter box 18 to flow into the main tank 19 by a gravity action. And, reference number 24 denotes a suction tube of the pump 21, and 25 denotes a bell-mouth fixed at the lower end of the suction tube 24.

The discharge rate Q of the above-described pump 21 is determined as follows. That is, the one-time supply volume of process liquid s is Q1 when intermittently supplying process liquid to necessary points, discharge time during which process liquid s of one-time supply volume is caused to flow out from the sub tank 20 to a workpiece w is T1, and the time from discharge of process liquid s of the above-described one-time supply volume to discharge of the process liquid s of the next one-time supply volume is T2, the discharge rate Q of a pump is greater than the value of Qmin, which is calculated by Expression Qmin=Q1×T1/T2, and is made smaller than the one-time flow volume of process liquid, preferably, is made approximately coincident with the value of Qmin.

A tubing channel 26 is routed from the discharge port of the pump 21 to the sub tank 20, and a float opening and closing valve 27 is secured at the termination of the tubing channel 26. The float opening and closing valve 27 stops inflow of process liquid from the pump 21 into the sub tank 20 when the volume of the process liquid s in the sub tank 20 approximately reaches the above-described one-time supply volume. A bypass tubing channel 28 overflows surplus process liquid s into the tank 19 when the process liquid s is excessively supplied into the sub tank 20. The bypass tubing channel 28 causes process liquid to flow around the fixture on the workrest 2 (the surrounding portion of the workrest) as shown in the illustrated examples (FIG. 1 and FIG. 3), and contributes to discharge and removal of cutting chips scattered in the corresponding surrounding portion.

The sub tank 20 is installed with a pair of left and right props 29 and 29 so that the upper surface thereof is open to the atmosphere and the bottom 20a thereof is determined at a position higher by a distance h of approximately 0.5 through 10 meters than the upper surface of the workrest 2. In fact, the distance h is determined to be 2.5 through 3 meters in view of a reduction in the consumption power of the pump 21, and the capacity of the sub tank 20 is determined to be approximately 10 through 100 liters.

The process liquid passage means 22 is provided with process liquid line opening and closing means 30 formed on the bottom 20a of the sub tank 20, a tubing channel 31 extending downward from a discharge port a of the process liquid line opening and closing means 30, a pair of bifurcated tubing channels 32 and 32, which are formed by causing the tubing channel 31 to be bifurcated, and a nozzle 33 formed at the termination of the respective bifurcated tubing channels 32, wherein, when the above-described process liquid line opening and closing means 30 is opened, process liquid s of one-time supply volume in the sub tank 20 is caused to flow down by a gravity action through the tubing channel 31 and bifurcated tubing channels 32 and 32 and is jetted through respective nozzles 33 in several tens of seconds, and when the process liquid line opening and closing means 30 is closed, the process liquid s in the sub tank 20 is prevented from flowing into the tubing channel 31.

At this time, the process liquid line opening and closing means 30 is provided with a valve body 34 to close up the discharge port a formed on the bottom 20a of the sub tank 20, a rod 35 having the valve body 34 fixed, and a pneumatic cylinder device 36 to vertically drive the rod 35. The valve body 34 is displaced and elevated by a shortening action of the pneumatic cylinder device 36, wherein the discharge port a is opened. And, the valve body 34 is displaced and lowered by an elongating action of the pneumatic cylinder device 36, wherein the discharge port a is closed.

Compressed air is supplied to the pneumatic cylinder device 36 through an air supply change valve (not illustrated), wherein shortening and elongation actions are carried out by changing over the air supply change valve by a control operation of a control device 37 mounted at the rear end of the foundation base 1.

And, the respective nozzles 33 have a circular jetting port whose diameter is 6 through 8 mm, and are made round, or have a rectangular port whose shape is 4 mm long and 80 mm wide, and are made rectangular.

A description is given of a use example and actions of the apparatus according to the present invention.

In the example, it is assumed that a plurality of workpieces w are machined one after another. Also, it is optional that operations of the respective operating portions are automatically carried out by the control device 37, or are artificially carried out.

After the first workpiece w is fixed on the workrest 2 with a fixture 3, the pump is always caused to rotate, and commences an operation for machining, wherein the respective spindles 14 are rotated, the gang head 13 is displaced in the left direction in FIG. 2, and the cutters 16 fixed on the respective spindles 14 begin to machine the workpiece w.

Immediately prior to commencement of the cutter 16 to machine the workpiece w, the process liquid line opening and closing means 30 of the process liquid passage means 22 is operated to be opened, whereby the process liquid s stored in the sub tank 20 in advance is caused to flow out from the respective nozzles 33 through the discharge port a, tubing channel 31, and bifurcated tubing channels 32 and 32 by a gravity action, and is consecutively supplied to the workrest 2 and necessary points of the workpiece w. Herein, the necessary points of the workpiece w indicate points to which process liquid s must be supplied to wash away cutting chips produced through cutting or machining of the workpiece w by the cutters 16, and points to which it becomes necessary for process liquid s to be supplied to frictional points between the workpiece w and the cutters 16 for lubrication. The flow rate in supply of the process liquid s is always made roughly coincident with the maximum instantaneous flow rate required in connection with the conventional supply of process liquid s to necessary points, and the process liquid s is consecutively supplied while the cutters 16 are cutting or machining the workpiece w.

The process liquid s thus supplied washes away cutting chips adhered to the workrest 2 and workpiece w fixed thereon into the filter box 18, and simultaneously lubricates necessary points to be lubricated, which are frictional points between the workpiece and cutters. The cutting chips and process liquid s flown into the filter box 18 are separated from each other therein, and the chips are removed. The process liquid s from which the cutting chips are removed is caused to flow in the main tank 19, and again is transferred into the sub tank 20 by the pump 21.

And, when the workpiece w is cut or machined by the cutters 16, the process liquid line opening and closing means 30 is closed to stop the supply of the process liquid s from the sub tank 20. Subsequently, although the process liquid s in the sub tank is continuously supplied from the opening operation of the above-described process liquid line opening and closing means 30 to the closing operation thereof, the continuous one-time flow volume means the above-described one-time supply volume.

In this connection, when supply of the process liquid s stops, the fixing of the workpiece w by the fixture 3 is released, and the machined workpiece w is carried out to the next process. After that, a next workpiece w is carried onto the workrest 2, and is fixed as in the previous workpiece w. Subsequently, operations similar to the above are repeated.

In the above-described embodiment, where it is assumed that the required maximum instantaneous flow rate Q1 of process liquid s flowing out from the sub tank 20 is 200 liters per minute, time T1 which is required for the process liquid s to flow out from the sub tank 20 by one-time supply volume is 20 seconds, and time T2 from the discharge of the process liquid by the above-described one-time supply volume to the discharge thereof by the next one-time supply volume is 100 seconds, the discharge capacity Q of the pump 21 is coincident with Qmin, which is calculated by Expression Qmin=Q1×T1/T2, that is 40 liters per minute, and the discharge pressure of the pump 21 (including the resistance of the tubing channel) is 0.06 MPa.

Figure 4:
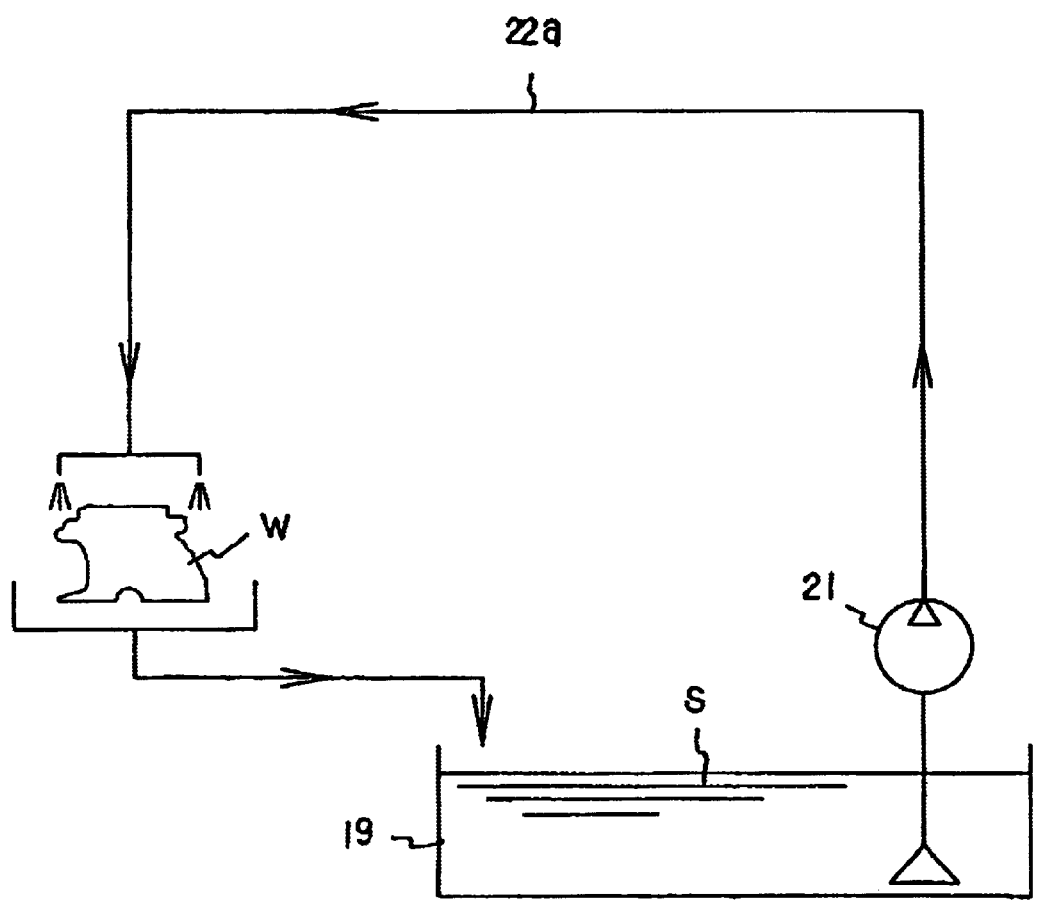
FIG. 4 is a view showing a system for supplying process liquid in a prior art machine tool.

In the prior art process liquid supplying apparatus shown in FIG. 4 corresponding to the above-described embodiment, the flow rate to supply process liquid s to necessary points to which process liquid s is supplied is always 200 liters per minute, which is the maximum instantaneous flow rate Q1, and the discharge pressure of the pump 21 is 0.3 MPa or so.

Under such conditions, the consumption power of the pump 21 is as follows when the above-described embodiment is compared with the prior art.

The consumption power W (Kw) of the pump 21 is expressed by Expression W=k☐Pt☐Qt where it is assumed that the discharge pressure of the pump 21 is Pt(MPa) and the flow rate is Qt (liters per minute).

Therefore, the ratio of the consumption power W1 of the prior art pump to the consumption power W2 of the pump according to the above-described embodiment becomes:

$$W1:W2 = (k \times 0.3 \times 200):(k \times 0.06 \times 40)$$

$$= 60:2.4$$

As has been made clear on the basis of the above result, the consumption power W2 of the pump according to the above-described embodiment is only 4% of the consumption power of the prior art pump.

Next, a description is given of a modified version of the embodiment according to the invention.

Although, in the above-described embodiment, process liquid s is supplied from the sub tank 20 to frictional points between the workpiece w and the cutters 16, if lubrication at the frictional points between the workpiece w and cutters 16 is carried out by process liquid supplied from the inside of the spindle 14, the process liquid s flown out from the sub tank 20 is not supplied to the frictional points therebetween, but is supplied exclusively for washing away cutting chips.

Also, in dry cutting for which no lubrication of frictional points between the workpiece w and cutters 16 is required, it is not necessary to use process liquid s, whose lubrication performance is important, in connection with washing-away of cutting chips. In this case, publicly known cleaning fluid for which washability is important as a process liquid may be used.

Further, where the discharge flow rate of the pump 21 is larger than the above-described Qmin, it is not necessary for the pump 21 to rotate at all times during use of a machine tool. In this case, when the process liquid s stored in the sub tank 20 reaches a volume greater by an adequate volume than one-time supply volume of process liquid from the sub tank 20, the rotation operation of the pump 21 may be automatically stopped, and when the process liquid in the sub tank is decreased below the one-time supply volume, the rotation operation thereof may be automatically commenced. In addition, in such a case, the float opening and closing valve 27 is no longer required. Also, there is no problem if the invention is embodied so that a pump having a comparatively small discharge capacity is continuously driven, and process liquid that is slightly greater than one-time supply volume necessary for machining a workpiece is provided in the sub tank 20 by the operation, wherein the slight surplus process liquid is circulated into the main tank by a bypass tubing channel. This also resides in the scope of the invention.

INDUSTRIAL APPLICABILITY

According to the present invention constructed as described above, even if a pump has only a comparatively small discharge capacity and the entire head of the process liquid at any optional point in a sub tank is comparatively low, cutting chips can be accurately washed away, and necessary points to be lubricated by the process liquid is accurately lubricated. Therefore, the rated output, consumption power and power factor of the pump can be lowered to a large extent in comparison with prior arts, while maintaining actions by the process liquid such as washing-away and lubrication.

What is claimed is:

1. A method for supplying process liquid for a machine tool, comprising: intermittently supplying one-time supply volumes of process liquid points associated with a machine tool by causing a volume of said process liquid stored in a sub tank installed at a suitable height, the volume roughly corresponding to a one-time supply volume, to flow down by gravity;
    collecting said supplied process liquid into a main tank; and
    transferring a volume of said process liquid stored in said main tank into said sub tank by a pump when the supply of process liquid from the sub tank to said points is stopped.

2. The method for supplying process liquid for a machine tool as set forth in claim 1, wherein when process liquid of a necessary volume is stored in said sub tank, transfer of said process liquid by said pump is stopped.

3. The method for supplying process liquid for a machine tool as set forth in claim 1, wherein when process liquid is excessively supplied in said sub tank, said process liquid overflows and a part thereof is circulated into said main tank.

4. The method for supplying process liquid for a machine tool as set forth in claim 1, wherein the process liquid is a coolant.

5. The method for supplying process liquid for a machine tool as set forth in claim 1, wherein the process liquid is a cleaning fluid.

6. The method for supplying process liquid for a machine tool as set forth in claim 1, wherein said points include at least one of: a workrest and a workpiece fixed on a workrest.

7. Apparatus for supplying process liquid for a machine tool with which are associated a workrest and a workpiece fixed thereon, comprising:

a main tank into which process liquid is caused to flow;

a sub tank installed at a position higher by a specified distance than e workrest, the sub tank storing process liquid of a volume roughly equivalent to a one-time supply volume that is sufficient for points requiring the process liquid to be supplied;

a pump for transferring the process liquid in the main tank to the sub tank; and a process liquid passage causing process liquid in the sub tank to flow out toward said points by a gravity action.

8. The apparatus for supplying process liquid for a machine tool as set forth in claim 7, wherein, where an instantaneous flow rate $Q1$ of process liquid is required when supplying process liquid to necessary points, the discharge time during which the one-time supply volume of process liquid is caused to flow out from the sub tank to a workpiece is $T1$, and the time from the discharge of said one-time supply volume to the discharge of the next one-time supply volume is $T2$, the discharge flow rate $Qmin$ of the pump is at least equal to a value which is calculated by the expression $Qmin=Q1 \times T1/T2$, and is smaller than the required instantaneous flow rate $Q1$ of process liquid.

9. The apparatus for supplying process liquid for a machine tool as set forth in claim 7, wherein the sub tank has a bottom, the workrest has an upper surface, and the bottom of the sub tank is approximately 0.5–10 meters higher than the upper surface of the workrest.

10. The apparatus for supplying process liquid for a machine tool as set forth in claim 7, wherein the process liquid is a coolant.

11. The apparatus for supplying process liquid for a machine tool as set forth in claim 7, wherein the process liquid is a cleaning fluid.

* * * * *